United States Patent [19]
Ladouce

[11] Patent Number: 5,798,076
[45] Date of Patent: Aug. 25, 1998

[54] TIRE MOLD AND PROCESS FOR THE MOLDING OF A TIRE

[75] Inventor: Jean-Pierre Ladouce, Clermont-Ferrand, France

[73] Assignee: Sedepro, Paris, France

[21] Appl. No.: 667,635

[22] Filed: Jun. 24, 1996

Related U.S. Application Data

[63] Continuation of Ser. No. 284,850, Aug. 2, 1994, abandoned.

[30] Foreign Application Priority Data

Aug. 6, 1993 [FR] France .................................. 93 09799

[51] Int. Cl.⁶ .................................................. B29C 35/02
[52] U.S. Cl. .................... 264/326; 425/39; 425/47; 425/812
[58] Field of Search ........................... 425/39, 47, 46, 425/812; 264/315, 326

[56] References Cited

U.S. PATENT DOCUMENTS

| | | |
|---|---|---|
| 2,297,017 | 9/1942 | Overman . |
| 2,679,172 | 5/1954 | Clevenger et al. . |
| 2,754,546 | 7/1956 | Mason et al. . |
| 4,058,422 | 11/1977 | Taylor . |
| 4,691,431 | 9/1987 | Hayata . |
| 5,186,952 | 2/1993 | Lo et al. . |
| 5,234,326 | 8/1993 | Galli et al. ........................ 425/812 |
| 5,382,402 | 1/1995 | Espie et al. ........................ 264/326 |
| 5,492,669 | 2/1996 | Laurent ............................ 264/326 |

FOREIGN PATENT DOCUMENTS 61-164806 7/1986 Japan ................................. 425/812

OTHER PUBLICATIONS

Database WPI Week 7649, Derwent Publications Ltd., London, GB; AN 76-91423X & JP-A-51 119 776 (Bridgestone Tire K.K) 21 Oct. 1976.

*Primary Examiner*—Mathieu D. Vargot
*Attorney, Agent, or Firm*—Baker & Botts, L.L.P.

[57] ABSTRACT

The tire mold includes a shell for the molding of the sidewalls, said shell including a laminated assembly formed of lamelliform elements directed substantially parallel to the axis, the molding surface for said sidewall being formed by the adjacent edges of the said lamelliform elements.

20 Claims, 4 Drawing Sheets

TIRE MOLD AND PROCESS FOR THE MOLDING OF A TIRE

This application is a continuation of application Ser. No. 08/284,850, filed on Aug. 2, 1994, now abandoned.

BACKGROUND OF THE INVENTION

The present invention relates to tire molds and, in particular, to the side portions of such molds, commonly known as shells, which are used to mold the visible part (outside part) of the sidewalls of the tire.

During the molding of the tire, it is necessary to be able to evacuate all the air which might be imprisoned between the tire introduced into the mold and the different parts of the mold. If the slightest pocket of imprisoned air remains between the mold and the tire, this will cause a molding defect which appears on the outer surface of the tire. Such molding defects are unacceptable both from the standpoint of the quality of the tire manufactured and from the standpoint of its aesthetic appearance. Now, it is known that it is impossible to assure total venting of a mold naturally, that is to say, by simply using the spaces between the different component parts of the mold in order to assure the evacuation of the air. Recourse is therefore had to various palliatives, one of which is very well known and of general use in the tire industry, namely the drilling of small vent holes wherever necessary in the mold.

When such vents are used, a trace of them is seen on the molded tire in the form of small protuberances of rubber which extend from the surface of the tire. It is well known that, as soon as an interstice exceeds a size of 0.05 mm, it is, of course, capable of assuring the venting, but at the same time it permits a slight leakage of raw rubber. Now, it is impossible to effect drillings of a diameter of less than 0.05 mm economically. For this reason, one continues to see on most tires a trace of the small vent holes in the form of small protuberances extending from the surface of the tire.

SUMMARY OF THE INVENTION

One object of the present invention is to eliminate the vent holes on the shells of tire molds. The proper venting of a mold actually requires the drilling of vent holes also on the shells which effect the molding of the sidewalls. Therefore, molding burrs appear on the sidewalls of the tire, and these burrs remain visible for even a long time after the commencement of the use of the tire, since the sidewalls normally do not suffer any wear by rubbing, contrary to the tread on which all the molding burrs soon disappear within the first miles traveled by the tire.

Another object of the invention is to assure perfect venting of the tire mold shells without leaving the slightest trace thereof on the tire when the latter has been molded and vulcanized, such as, for instance, small surface ribs molded in corresponding grooves machined on the mold for the sole purpose of evacuating the imprisoned air upon the molding.

In accordance with the invention, the tire mold, which comprises two shells for the molding of the sidewalls of the tire and means for molding the tread of the tire, is characterized by the fact that at least one shell comprises a laminated assembly formed of lamelliform elements having side faces and edges, said side faces being oriented substantially parallel to the axis of the mold and adjacent to each other, and means for maintaining said side faces pressed against each other while maintaining sufficient clearance between said lamelliform elements for the passage of air, the molding surface for said sidewall being formed by the adjacent edges of the said lamelliform elements.

By the expression "axis of the mold" there is designated the axis corresponding to the axis of rotation of the molded tire the mold and the tire molded therein having a common axis. The laminated assembly is formed of lamelliform elements parallel to the axis, or possibly slightly inclined with respect to it by, for instance, an angle which may extend up to 30°.

The invention also covers a molding process employing such a mold in which the evacuation of the air is assured by the channeling of the air between the lamelliform elements.

DESCRIPTION OF THE DRAWINGS

The following figures make it possible clearly to understand the invention, based on the detailed description of various aspects of the embodiment of a mold in accordance with the invention.

DESCRIPTION OF PREFERRED EMBODIMENTS

Figure 1:
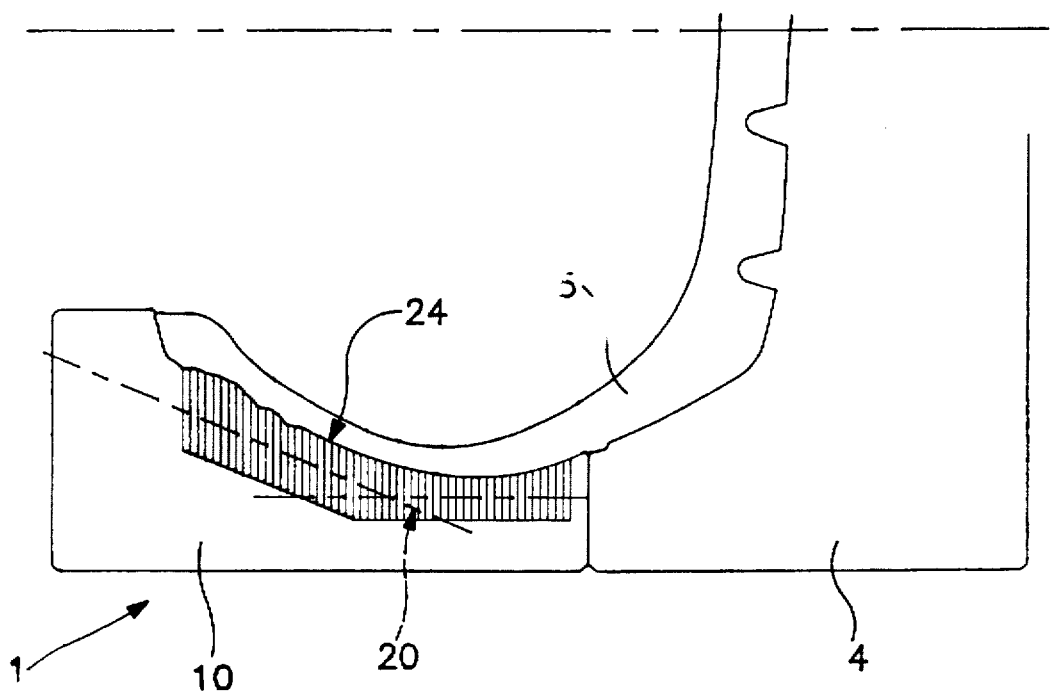
FIG. 1 shows, in radial section, a shell and its use for molding a tire.

FIG. 1 is a radial section showing a mold of the so-called sector type, in which there can be noted a side shell 1 and the sector 4. The shell 1 is characterized by a stack of metal sheets and therefore does not have the usual solid appearance, as seen in radial section. Said sheets constitute the lamelliform elements used. The thickness of the said lamelliform elements is preferably between 0.1 and 5 mm.

Figure 2:
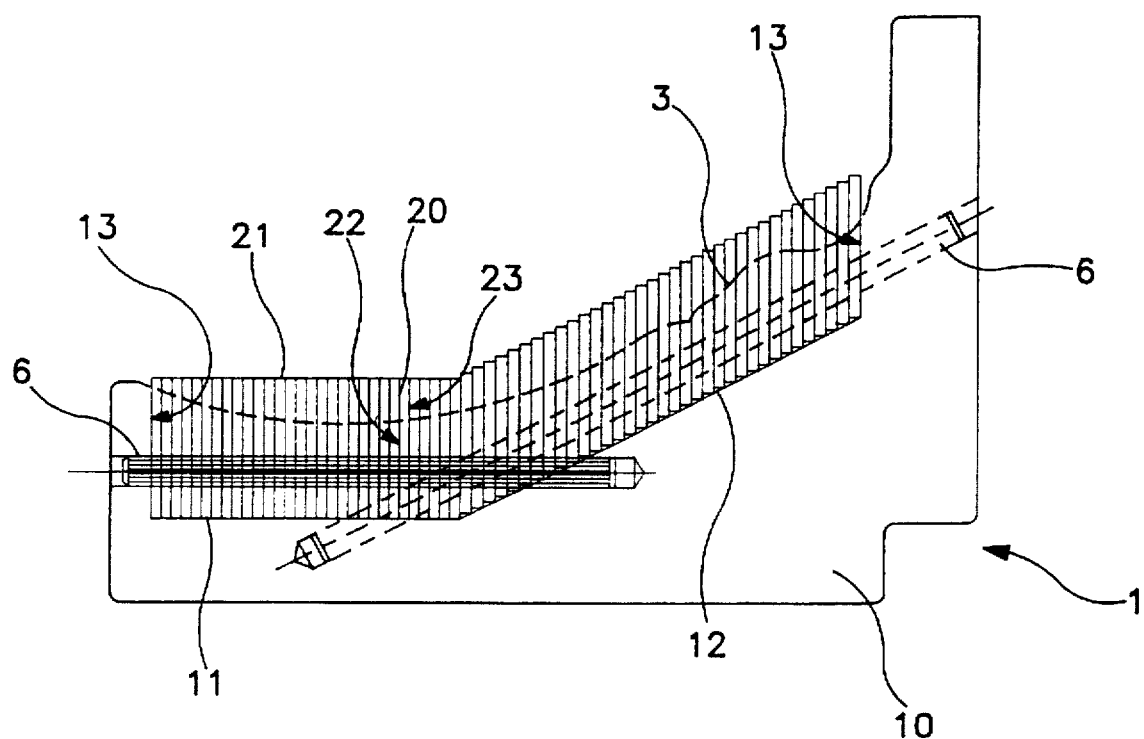
FIG. 2 shows a phase of the production of a shell.
Figure 3:
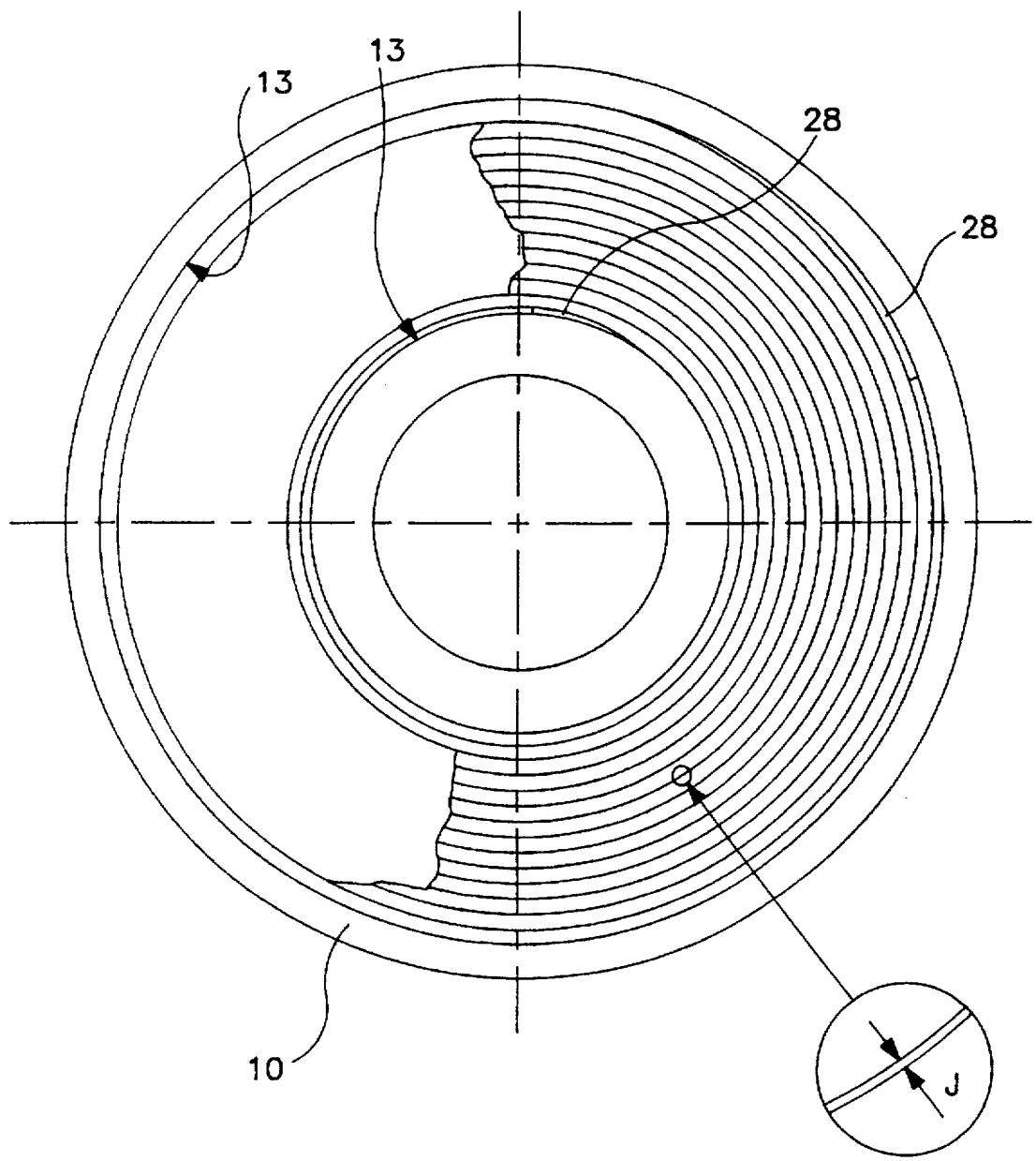
FIG. 3 shows a side view of a shell.

FIG. 2 shows a stage of manufacture which will be referred to as the "production of the blank". The shell comprises a solid support 10 in which there have been machined a flat face 11 and then a frustoconical face 12, and finally two cylindrical faces 13. These different faces define a recess within which a strip of metal sheet, designated 20, is spirally wound. The side faces 22 and 23 of the strip 20 adjoin to the adjacent side faces. At the start and end of the spiral, a strip 28 of variable thickness (see FIG. 3) must be used or the empty space corresponding to the difference between the spiral formed by the strip 20 and the cylindrical faces 13 machined on the support 10 (FIG. 2) must be filled in some other manner. In this stage of manufacture, the edge 21 of the strip 20 which is on the side opposite the support 10 reproduces the shape of the bottom of the recess machined on the support 10.

In general, the shape of the bottom of the recess is selected so as to be simple to machine while approximating the actual final shape of the sidewall of the tire which is to be molded. This shape is indicated by the dashed line 3 in FIG. 2. All the turns formed by the strip 20 must overlap this line 3. The strips are preferably locked on the support 10 by drilling holes as indicated in FIG. 2 and inserting one or more pins 6 therein. The following operation consists in machining the laminated assembly thus obtained to the exact shape of the molding shell in accordance with the dashed line 3 in FIG. 2 so as to obtain a shell 1 such as that shown in FIG. 1. This machining operation can be entirely similar to the operation of machining from the solid.

Even when assuring a winding of the strip 20 with contiguous joints which is as tight as possible, there will always remain between the turns a clearance J (see enlargement in FIG. 3) which is sufficient to assure a perfect venting at all points of the shell 1 of such a mold.

It is known that it is advisable for this clearance to be less than 0.05 mm, and preferably less than 0.03 mm, taking into account the nature of the rubber mixes used for the sidewalls.

In accordance with a preferred embodiment of the invention, the lamelliform element has been subjected to a knurling before being assembled in order to constitute the molding surface. By means of a cylindrical roller the surface of which has sharp-edged transverse ribs, the said strip (or more generally, the lamelliform element) is pressed so as to mark at least one side face with transverse grooves extending from the said edge to the side of the said side faces opposite said edge, in order thus to form special paths for the venting. The pressure exerted on the surface of the lamelliform element is preferably adjusted in such a manner that the grooves have a depth of about 0.01 mm. The air evacuation paths are thus much less disposed to become dirty and the venting retains its entire effectiveness even after a very large number of vulcanization cycles.

Figure 4:
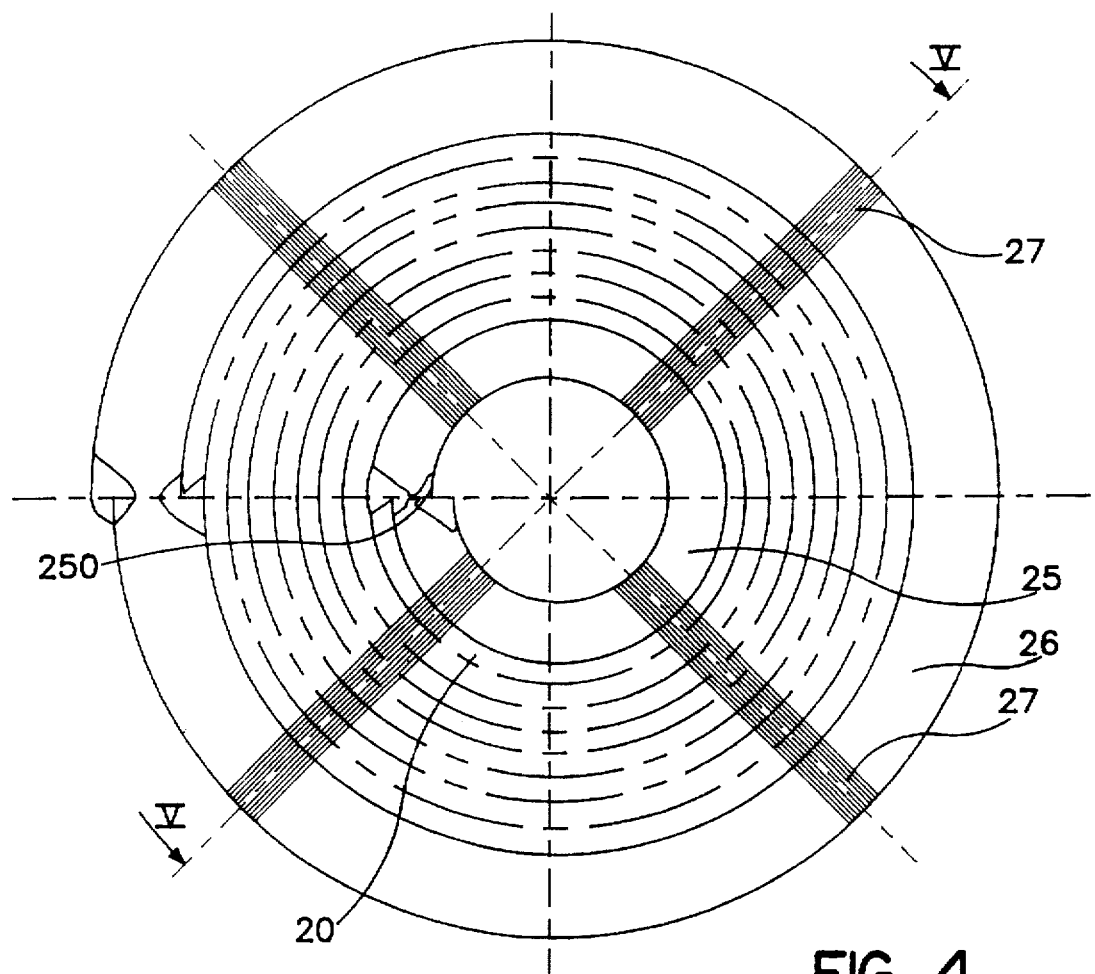
FIG. 4 shows a shell from the back, illustrating a variant of manufacture.

One can, of course, employ different structural variants without going beyond the scope of the present invention. Thus, the recess of the support 10 need not have a conical portion. The lamelliform elements could be hoops of different diameter the edges of which form a network of concentric figures. A spiral winding can be obtained in different manner, as explained below with references to FIGS. 4 to 6 which illustrate an assembly produced without separate support. An assembly thus constituted could then also be placed in a support such as described in FIGS. 1 and 2.

In the second variant, one starts from a hoop 25 (FIG. 4) the two ends of which are welded together at 250 so as to leave a radial offset corresponding to the thickness of the strip 20 which is to be used. A strip 20 is then wound with contiguous turns on this winding support formed by the hoop, as in the first variant. The winding is terminated by covering it with a hoop 26 the ends of which are also welded together with radial offset.

Figure 5:
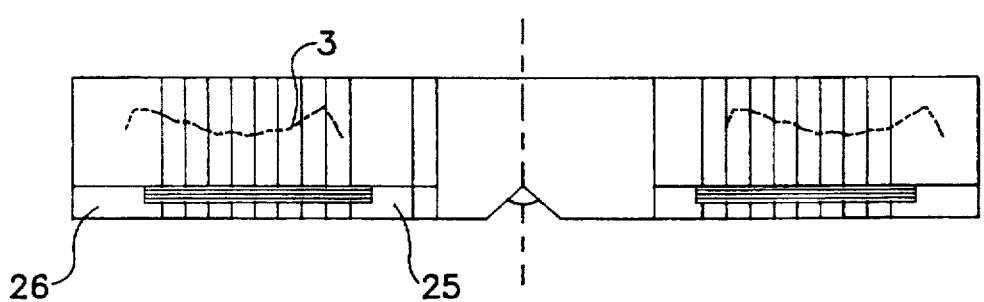
FIG. 5 is a section along the line V/V of FIG. 4, illustrating the production of a blank.
Figure 6:
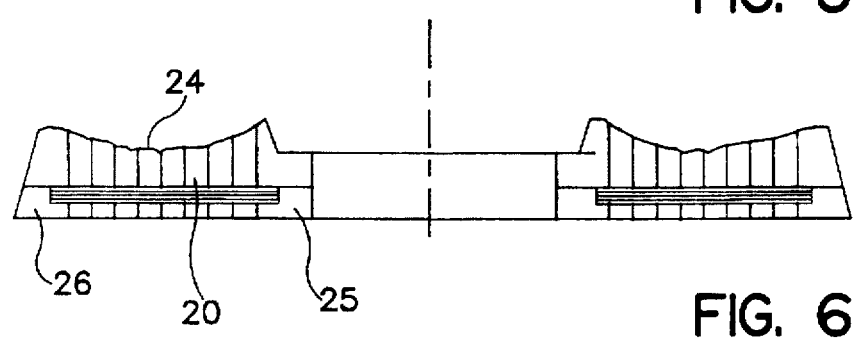
FIG. 6 is a view along the same section plane, showing the shell after machining.

After this first winding step, one can (but this is not necessary) deform the sheet metal stack so as to obtain a conical portion as in the preceding variant. The assembly thus constituted is stabilized by a few weld beads such as 27 arranged radially on the back of the winding (FIG. 5). The blank is then obtained. The next step is the machining of the blank. The radial offset on the hoops 25 and 26 is done away with so as to obtain the desired shape of the shell, or else a form permitting the insertion of the assembly in a support such as 10. After machining along the dashed line 3 (FIG. 5) there is obtained a laminated shell the essential part of the molding surface of which is defined by the edges 24 of the strips 20 (FIG. 6). In all these variant embodiments, the lamelliform elements are disposed in such a manner that their side faces are directed parallel to the axis of the mold across the entire widths of the side faces between opposite edges as shown in FIGS. 1 and 2.

In order not to encumber the drawings with needless details, it has not been shown how the air is evacuated from the support 10. We may point out that this must comprise one or more holes in order to place the bottom of the recess in communication with the outside. In order to favor the drainage of the air, the support can be provided with air evacuation paths arranged on the face thereof receiving the said elements on the their edge opposite the molding edge; this is, for instance, a network of grooves leading to the said holes.

The assembly of lamelliform elements itself can be produced somewhat differently. It goes without saying that a small number of strips 20 can be used instead of a single one. The said strip 20 can be wound with controlled axial offset from one turn to the next in order, by successive increments, to define directly a molding surface corresponding to the shape of the sidewall of the tire to be molded, directly, without requiring finishing by machining (except, of course, for markings). The lamelliform elements could be disposed radially and not in spirals or concentric rings, possibly in several layers each forming a crown. The passage of the air between adjacent lamelliform elements can be favored by using elements the faces of which in contact with each other are striated. It will be understood that the concept proposed by the invention is directed at obtaining a laminated structure in order to provide small interstices which are oriented perpendicular to the molding surface.

I claim:

1. A tire mold including two shells for the molding of the side walls of the tire, and means for molding the tread of the tire, at least one shell comprising a laminated assembly formed of lamelliform elements having side faces and edges, the side faces being oriented substantially parallel to the common axis of the mold and tire across the entire widths of the side faces between opposite edges and being adjacent, the thickness of said lamelliform elements being between 0.1 and 5 mm., and means for maintaining the side faces pressed against each other while maintaining sufficient clearance for the passage of air between said lamelliform elements, the molding surface for the side wall being formed of adjacent edges of said lamelliform elements.

2. A mold according to claim 1, in which the edges form a network of concentric figures.

3. A tire mold including two shells for the molding of the side walls of the tire, and means for molding the tread of the tire, at least one shell comprising a laminated assembly of lamelliform elements having side faces and edges, the said side faces being oriented substantially parallel to the common axis of the mold and the axis of a tire made therein across the entire widths of said side faces between opposite edges and being adjacent, and means for maintaining sufficient clearance for the passage of air between said lamelliform elements, the molding surface for said side wall being formed of adjacent edges of said lamelliform elements, and in which the said assembly is a winding of a strip in contiguous turns forming a spiral.

4. A mold according to claim 3, in which each turn of the wound spiral strip has a controlled axial offset from one turn to the next in order to define a molding surface corresponding to the shape of the tire sidewall to be molded.

5. A mold according to claim 1, in which each line of intersection between the edge and a side face of an element matches with a corresponding line of an adjacent element.

6. A mold according to claim 1, in which the clearance between adjacent lamelliform elements is less than or equal to 0.03 mm.

7. A mold according to claim 1, including a supporting surface on which the assembly of lamelliform elements is mounted and air evacuation paths arranged on said surface which receives the edges of said elements opposite the molding edges.

8. A mold according to claim 3, in which the thickness of said lamelliform elements is between 0.1 and 5 mm.

9. A mold according to claim 1, in which at least one of the said side faces has transverse grooves extending across the said side face from one edge to the opposite edge in order thus to form paths for the venting.

10. A mold according to claim 9, in which the grooves have a depth of about 0.01 mm.

11. A process for molding a tire in a mold having two shells for the molding of the side walls of the tire, and means for molding the tread of the tire, at least one shell comprising a laminated assembly formed of lamelliform elements having side faces and edges, the side faces being oriented substantially parallel to the common axis of the mold and a tire made therein across the entire widths of said side faces between opposite edges and interfacing with adjacent side faces, and means for maintaining said side faces pressed against each other while maintaining sufficient clearance for the passage of air between said lamelliform elements, the molding surface for said side wall being formed of adjacent edges of said lamelliform elements having a thickness between 0.1 and 5 mm., said process including, at the time of the molding, the steps of evacuating air from the mold by axial flow through the clearances between the side faces of the lamelliform elements and molding the side walls of the tire against the edges of said lamelliform elements.

12. A tire mold including two shells for the molding of the side walls of the tire, at least one shell comprising a laminated assembly formed of lamelliform elements having side faces and edges, the said side faces being oriented substantially parallel and concentric to the common axis of the mold and a tire made in the mold across the entire widths of said side faces between opposite edges and interfacing with adjacent substantially concentric side faces, the thickness of said lamelliform elements being between 0.1 and 5 mm., and means for maintaining the said side faces pressed against each other while maintaining sufficient clearance for the axial passage of air between said lamelliform elements, the molding surface for said side wall being formed of adjacent, substantially concentric edges of said lamelliform elements.

13. A process for molding a tire in a mold having two shells for the molding of the side wall of the tire, and means for molding the tread of a tire, at least one shell comprising a laminated assembly formed of lamelliform elements having side faces and edges, the side faces being oriented substantially parallel and concentric to the common axis of the mold and a tire made therein across the entire widths of the side faces between opposite edges and interfacing with adjacent substantially concentric side faces, the thickness of said lamelliform elements being between 0.1 and 5 mm., and means for maintaining the side faces pressed against each other while maintaining sufficient clearance for the passage of air between said lamelliform elements, the molding surface for said side wall being formed of adjacent, substantially concentric, edges of said lamelliform elements, said process including, at the time of molding, the steps of evacuating air from the mold by axial flow through the clearance between the concentric side faces of the lamelliform elements and molding the side walls of a tire against the substantially concentric edges of said lamelliform elements.

14. A tire mold including two shells for the molding of the side walls of the tire, and means for molding the tread of the tire, at least one shell comprising a laminated assembly of lamelliform elements having side faces and edges, the said side faces being oriented substantially parallel to the common axis of the mold and the axis of a tire made therein across the entire widths of said side faces between opposite edges and being adjacent, the molding surface for said side wall being formed of adjacent edges of said lamelliform elements, and in which the said assembly is a winding of a strip in contiguous turns forming a spiral.

15. A mold according to claim 14 in which each line of intersection between the edge and a side face of an element matches with a corresponding line of an adjacent element.

16. A mold according to claim 14 in which the clearance between adjacent lamelliform elements is less than or equal to 0.03 mm.

17. A mold according to claim 14, including a supporting surface on which the assembly of lamelliform elements is mounted and air evacuation pads arranged on said surface which receives the edge of said elements opposite the molding edges.

18. A mold according to claim 14 in which the thickness of said lamelliform elements is between 0.1 and 5 mm.

19. A mold according to claim 14 in which at least one of the said side faces has transverse grooves extending across the said side face from one edge to the opposite edge in order to form paths for venting.

20. A mold according to claim 19 in which the grooves have a depth of about 0.01 mm.

* * * * *

UNITED STATES PATENT AND TRADEMARK OFFICE
CERTIFICATE OF CORRECTION

PATENT NO. : 5,798,076
DATED : August 25, 1998
INVENTOR(S) : Ladouce

It is certified that error appears in the above-identified patent and that said Letters Patent is hereby corrected as shown below:

On the title page, under "Foreign Patent Documents", the following two references should have been inserted: --DE C 343212 10/1921 Germany; DE A 2210099 9/1973 Germany--.

Signed and Sealed this

Thirty-first Day of August, 1999

Attest:

Q. TODD DICKINSON

Attesting Officer

Acting Commissioner of Patents and Trademarks